106. COMPOSITIONS, COATING OR PLASTIC.
84
(No Model.)
C. J. VAN DEPOELE.
INSULATING MATERIAL.
No. 287,346. Patented Oct. 23, 1883.
Silicate of Soda
Zinc White or Red Lead
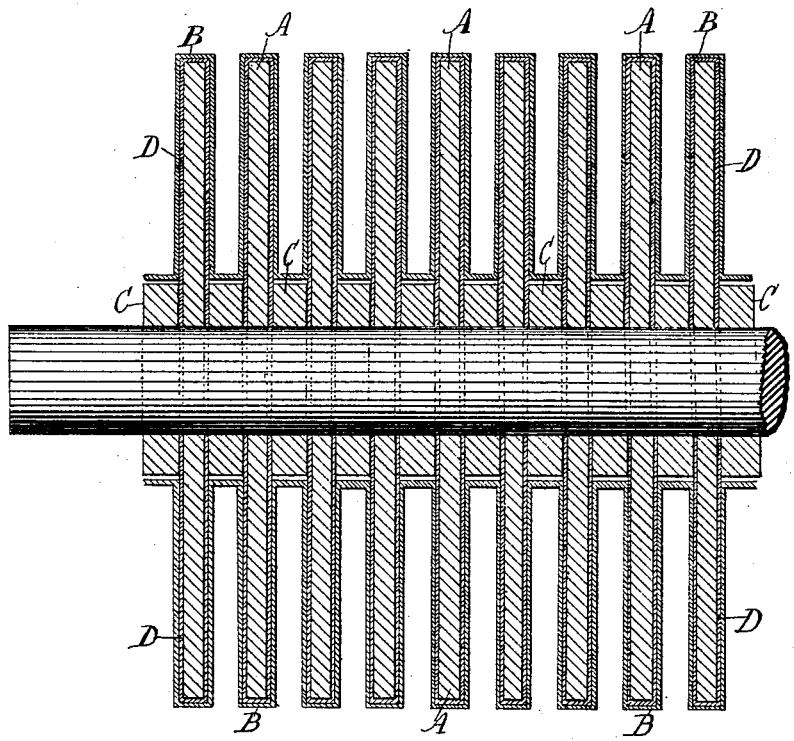
WITNESSES:
W. P. Robertson
E. H. Bond
INVENTOR
C J Van Depoele
BY J. W. Robertson
ATTORNEY.

UNITED STATES PATENT OFFICE.

CHARLES J. VAN DEPOELE, OF CHICAGO, ILLINOIS.

INSULATING MATERIAL.

SPECIFICATION forming part of Letters Patent No. 287,346, dated October 23, 1883.

Application filed April 4, 1883. (No model.)

*To all whom it may concern:*

Be it known that I, CHARLES J. VAN DEPOELE, of Chicago, in the county of Cook and State of Illinois, have invented new and useful Improvements in Insulating Material; and I do hereby declare that the following is a full, clear, and exact description thereof, reference being had to the accompanying drawing, which forms a part of this specification.

This invention relates to a new insulating material, particularly adapted for use where much heat is generated; and it consists in the use of silicate of soda mixed with zinc-white or red lead, or other suitable oxides of metals or earthy substances, in the manner hereinafter more fully described, and then pointed out in the claims.

In describing my invention I will illustrate it as applied to the machine described in Letters Patent No. 275,549, granted to me April 10, 1883, of which this application is a division.

In the accompanying drawing, A represents a sectional view of some of the iron disks of said machines; B, the copper strip through which the current passes, and C the collars keeping the disks a suitable distance apart. These disks A are covered on both sides with paper D, impregnated with silicate of soda, mixed zinc-white or red lead, or any other oxide or earthy material, which, uniting with the silicate, renders the paper covering less liable to be affected by heat. This paper is cemented to the disks on both sides with a similar composition, and will thus insulate all the disks A from the copper strip B, and prevent the destruction of the insulation of the armature by heat.

In carrying out my invention I prefer to mix with the silicate zinc-white or red lead, as they form, under heat, a hard enamel capable of enduring great heat; but any earthy matters that will combine with the silicate to form an enamel may be used. This compound will thus be found very useful, not only for its insulating properties, but also for its ability to stand heat, which will be found very great, for if applied between layers of cotton-covered wire, if said wire were so heated as to burn the cotton covering, the insulation of the wire would still be perfect.

Although I have shown the silicate-of-soda compound used in connection with the paper, it is evident that by mixing the silicate with proper earthy matters, and of a suitable consistency, it may be used without paper.

I am aware that it is not new to use paper treated with a silicate for insulating purposes, and make no claim to this.

What I claim as new and of my invention is—

1. The insulating compound herein described, consisting of silicate of soda mixed with earthy substances or metallic oxides, substantially as described.

2. As an insulating material, paper saturated with silicate of soda mixed with earthy substances or metallic oxides, substantially as specified.

CHARLES J. VAN DEPOELE.

Witnesses:
ALEXANDER J. R. FIEGO,
THEO. P. BAILEY.